(12) United States Patent
Graham (10) Patent No.: US 8,179,789 B2
(45) Date of Patent: May 15, 2012

(54) SYSTEM AND METHOD FOR TIMESTAMPS FOR MEDIA STREAM DATA

(75) Inventor: Harry L. Graham, San Jose, CA (US)

(73) Assignee: WINNOV, LP, Santa Clara, CA (US)

(*) Notice: Subject to any disclaimer, the term of this patent is extended or adjusted under 35 U.S.C. 154(b) by 627 days.

(21) Appl. No.: 11/479,355

(22) Filed: Jun. 30, 2006

(65) Prior Publication Data

US 2007/0005794 A1      Jan. 4, 2007

Related U.S. Application Data

(60) Provisional application No. 60/695,998, filed on Jul. 1, 2005.

(51) Int. Cl.
*H04J 3/06* (2006.01)
(52) U.S. Cl. .................................. 370/229; 370/503
(58) Field of Classification Search .................. None
See application file for complete search history.

(56) References Cited

U.S. PATENT DOCUMENTS

| | | | |
|---|---|---|---|
| 5,530,661 A | 6/1996 | Garbe et al. | 364/728.01 |
| 5,661,728 A * | 8/1997 | Finotello et al. | 370/503 |
| 5,758,094 A | 5/1998 | Goettsch | 395/200.34 |
| 5,790,543 A * | 8/1998 | Cloutier | 370/252 |
| 5,978,857 A | 11/1999 | Graham | 709/301 |
| 6,546,496 B1 * | 4/2003 | Wang et al. | 713/322 |
| 7,499,500 B2 * | 3/2009 | Page | 375/295 |
| 2003/0196210 A1 | 10/2003 | Alves | 725/126 |
| 2004/0090994 A1 * | 5/2004 | Lockridge et al. | 370/509 |
| 2005/0249115 A1 * | 11/2005 | Toda et al. | 370/229 |

* cited by examiner

*Primary Examiner* — Kwang B Yao
*Assistant Examiner* — Alex Skripnikov
(74) *Attorney, Agent, or Firm* — West & Associates, A PC; Stuart J. West; Ted A. Marsh (57) ABSTRACT

Within a computer system, a system and method of providing timestamps for media stream input data is provided. A first clock count register is responsive to a first timebase, and a second clock count register is responsive to a second timebase. The first and second time bases can be correlated. When a frame of media stream input data is captured, the value of the first clock count register can be preserved. This value is a timestamp expressed in terms of the first timebase. The timestamp value in terms of the second timebase is computed and associated with the captured frame of media stream input data.

7 Claims, 4 Drawing Sheets

SYSTEM AND METHOD FOR TIMESTAMPS FOR MEDIA STREAM DATA

CLAIM OF PRIORITY

This application is related to and claims priority under 35 U.S.C. 119(e) to U.S. Provisional Patent Application No. 60/695,998 filed on Jul. 1, 2005 entitled "System and Method for Timestamps for Media Stream Data" by H. Graham the complete content of which is hereby incorporated by reference.

BACKGROUND

1. Field of the Art

The present disclosure pertains to a means of providing timestamps for frames of media stream input data that are captured by a computer system.

2. Related Art

A timestamp can be a recording of the measurement of the current time of an event, as used in a computer system. There can be one or more timelines, or time bases, along which the current time of an event can be measured. There can also be many choices for how a measured timestamp is expressed. A timestamp can be expressed as a measurement along the time base it first measured; it can also be expressed as a measurement along a time base that differs from the first.

One field of use for timestamps in combination with associated captured media stream data is synchronization for playback of a media stream or multiple media streams. A computer system can be used to develop and/or implement a relationship between a time base or timeline for playback, and the timestamps recorded and associated with captured media stream data. This relationship between recorded timestamps and the playback timebase can be used advantageously to position and "play back" the captured data with synchronization.

Playback synchronization can be useful for playback of more than one captured media stream concurrently. As an example, consider the situation where a computer system is used to concurrently play back a captured audio (sound) media stream and a captured video (image) media stream that have a preferred synchronization relationship. This preferred relationship can be the "lip synch" of commercial motion pictures, that is, movies. The experience of the playback audience can be degraded both by certain ranges of fixed time offsets between the two streams, and, by variability or "slip" in synchronization during the audience playback experience. There is a need to maintain a particular fixed timing relationship between the playback media streams, within a limited tolerance and with a limited variability.

Providing timestamps with captured media stream data can also be useful for the purposes of editing and/or analysis, for one or more captured media streams.

Reference herein to captured and/or recorded values, data, media streams, and media stream data can refer to information reduced to tangible or intangible means including volatile or temporary representations within computer systems.

A lack of accuracy in a timestamp measurement during media stream data capture can limit the performance of later processes that take the timestamp into account. Thus, high accuracy is a desirable feature of timestamps.

In some computer systems, a timestamp for a frame of captured media stream input data can be determined as follows. The processor receives an indication of a frame capture event through interrupt, polling, signal, or other means, and responds by taking a direct measurement of the current time with respect to the processor. This measurement can be as simple as the processor reading a register representing the current time from a real-time-clock subsystem or another subsystem; those subsystems not being directly responsive to the frame capture event. Problems associated with this method can include a total delay comprising contributory delays that are known and unknown, contributory delays that are fixed and variable, and contributory delay between the frame capture event and the processor response, hence a delay in taking the measurement. Some of the sources of contributory delays can be a result of the operating characteristics of the operating system, and, some of the sources of contributory delays may be a result of hardware and general system characteristics. The contributory delays and total delay can limit the accuracy of the timestamp measurement.

In some computer systems, a means of providing an accurate timestamp for a frame of captured media stream input data is provided as follows. A subsystem responds directly to a frame capture event and substantially immediately records or registers a timestamp measurement. The timestamp measurement can occur without need for the processor to respond between the frame capture event and the recording. For example, consider a computer system comprising a digital video capture subsystem that can capture media stream input that is digital video. The digital video can be formatted and interconnected as described in International Telecommunications Union standards ITU-R BT.601 and/or ITU-R BT.656. In these standards there can be a specific position within the media stream, and hence a specific time within a frame of digital video, corresponding to the first onset of vertical blanking within a frame of digital video. This subsystem can operate in combination with a digital audio capture subsystem that can capture media stream input that is digital audio representing sampled analog audio. The clock rate for captured digital audio samples can be 44.1 kHz or 48 kHz or another convenient rate. The audio capture subsystem can maintain an audio sample counter, corresponding to an audio timebase, that increments regularly and precisely with each captured audio sample. The digital video capture subsystem can detect the first onset of vertical blanking event that occurs during a frame of the captured media stream of digital video. The subsystems in combination can then register and/or record the current value of the audio sample counter at the time of the vertical blanking event. The registered and/or recorded value of the audio sample counter can be a timestamp, expressed along and in terms of an audio sampling timebase, for the frame of captured digital video. Within the computer system, this timestamp can be associated with the frame of captured digital video. The accuracy of this timestamp can be sufficient to synchronize a video frame to a particular audio sample time. That is, the video frame timestamp can be audio sample-accurate.

Some software architectures operating in some computer systems can require that a timestamp that is stored and/or associated with a frame of captured media stream data be expressed in terms of a specific timebase. This specific timebase can be associated with an arbitrary clock object. The specific timebase of this requirement can be a distinctly different timebase from the timebase used to first measure and register and/or record a timestamp for a frame of captured media stream input data.

For example, consider the previously described means of providing an accurate timestamp. In some software architectures operating in some computer systems there can be a requirement that the audio sample-accurate timestamp for a video frame be expressed in terms of system time. System time can be, for example, a timebase that is of a different frequency and/or phase than any of the timebases upon which the timestamp for a captured media stream data frame is initially measured. Each timebase of interest within the computer system can have an associated clock counter whose value regularly increments responsive to the period, fraction of a period, or multiple of a period, of a distinct clock signal and/or frequency associated with each timebase. Each of these clock counters can be started, stopped, and/or set to a particular value, independently, and at different moments. The relationship between each of these clock counters can be deterministic, but in general the relationship between them is not explicitly known.

Thus, there is a difficulty in the combination of obtaining an accurate timestamp value in terms of one timebase, and a system requirement to express the timestamp value in terms of another timebase.

Accordingly, in a computer system having a media stream input, an alternate means of providing an accurate timestamp for captured frames of media stream input data is needed.

DETAILED DESCRIPTION

Figure 1:
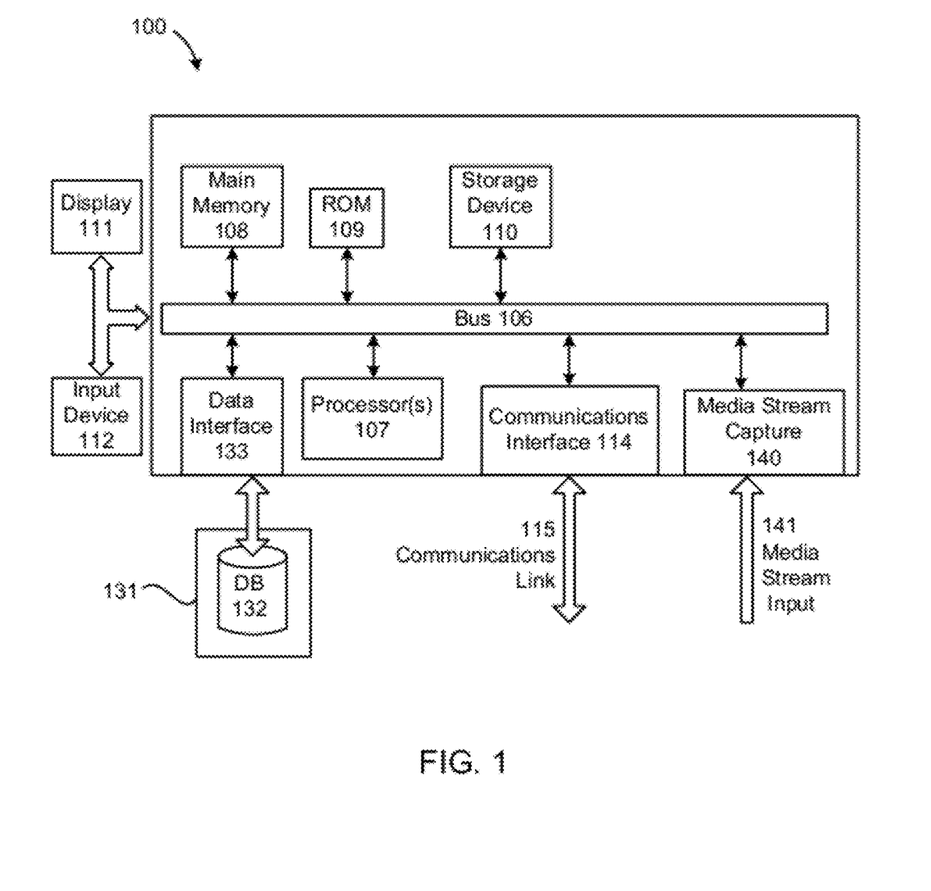
FIG. 1 is a block diagram of functional components of a computer system.

The execution of the sequences of instructions required to practice the embodiments may be performed by a computer system 100 as shown in FIG. 1. In an embodiment, execution of the sequences of instructions is performed by a single computer system 100. According to other embodiments, two or more computer systems 100 coupled by a communication link 115 may perform the sequence of instructions in coordination with one another. Although a description of only one computer system 100 will be presented below, however, it should be understood that any number of computer systems 100 may be employed to practice the embodiments.

A computer system 100 according to an embodiment will now be described with reference to FIG. 1, which is a block diagram of the functional components of a computer system 100. As used herein, the term computer system 100 is broadly used to describe any computing device that can store and independently run one or more programs.

Each computer system 100 may include a communication interface 114 coupled to the bus 106. The communication interface 114 provides two-way communication between computer systems 100. The communication interface 114 of a respective computer system 100 transmits and receives electrical, electromagnetic or optical signals that include data streams representing various types of signal information, e.g., instructions, messages and data. A communication link 115 links one computer system 100 with another computer system 100. For example, the communication link 115 may be a LAN, in which case the communication interface 114 may be a LAN card, or the communication link 115 may be a PSTN, in which case the communication interface 114 may be an integrated services digital network (ISDN) card or a modem, or the communication link 115 may be the Internet, in which case the communication interface 114 may be a dial-up, cable or wireless modem.

Each computer system 100 can include a media stream capture subsystem 140 coupled to the bus. In some embodiments a computer system can include one or more media stream capture subsystems. A media stream capture subsystem can capture media stream data present on a media stream input 141. The media stream input 141 can contain one or more distinct media streams, and a media stream capture subsystem can capture one or more of the distinct media streams present on a media stream input. Captured media stream data and other data, information, and signals present in the media stream capture subsystem can be communicated to other elements of the computer system using the bus means and/or by other means. Similarly, data, information, and signals present in the other elements of the computer system or computer systems can be communicated to the media stream capture subsystem using the bus means and/or by other means.

A computer system 100 may transmit and receive messages, data, and instructions, including program, i.e., application, code, through its respective communication link 115 and communication interface 114. Received program code may be executed by the respective processor(s) 107 as it is received, and/or stored in the storage device 110, or other associated non-volatile media, for later execution.

In an embodiment, the computer system 100 operates in conjunction with a data storage system 131, e.g., a data storage system 131 that contains a database 132 that is readily accessible by the computer system 100. The computer system 100 communicates with the data storage system 131 through a data interface 133. A data interface 133, which is coupled to the bus 106, transmits and receives electrical, electromagnetic or optical signals, that include data streams representing various types of signal information, e.g., instructions, messages and data. In some embodiments, the functions of the data interface 133 may be performed by the communication interface 114.

Computer system 100 includes a bus 106 or other communication mechanism for communicating instructions, messages and data, collectively, information, and one or more processors 107 coupled with the bus 106 for processing information. Computer system 100 also includes a main memory 108, such as a random access memory (RAM) or other dynamic storage device, coupled to the bus 106 for storing dynamic data and instructions to be executed by the processor(s) 107. The main memory 108 also may be used for storing temporary data, i.e., variables, or other intermediate information during execution of instructions by the processor(s) 107.

The computer system 100 may further include a read only memory (ROM) 109 or other static storage device coupled to the bus 106 for storing static data and instructions for the processor(s) 107. A storage device 110, such as a magnetic disk or optical disk, may also be provided and coupled to the bus 106 for storing data and instructions for the processor(s) 107.

A computer system 100 may be coupled via the bus 106 to a display device 111, such as, but not limited to, a cathode ray tube (CRT), for displaying information to a user. An input device 112, e.g., alphanumeric and other keys, is coupled to the bus 106 for communicating information and command selections to the processor(s) 107.

According to one embodiment, an individual computer system 100 performs specific operations by their respective processor(s) 107 executing one or more sequences of one or more instructions contained in the main memory 108. Such instructions may be read into the main memory 108 from another computer-usable medium, such as the ROM 109 or the storage device 110. Execution of the sequences of instructions contained in the main memory 108 causes the processor(s) 107 to perform the processes described herein. In alternative embodiments, hard-wired circuitry may be used in place of or in combination with software instructions. Thus, embodiments are not limited to any specific combination of hardware circuitry and/or software.

The term "computer-usable medium" as used herein, refers to any medium that provides information or is usable by the processor(s) 107. Such a medium may take many forms, including, but not limited to, non-volatile, volatile and transmission media. Non-volatile media, i.e., media that can retain information in the absence of power, includes the ROM 109, CD ROM, magnetic tape, and magnetic discs. Volatile media, i.e., media that can not retain information in the absence of power, includes the main memory 108. Transmission media includes coaxial cables, copper wire and fiber optics, including the wires that constitute the bus 106. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Figure 2:
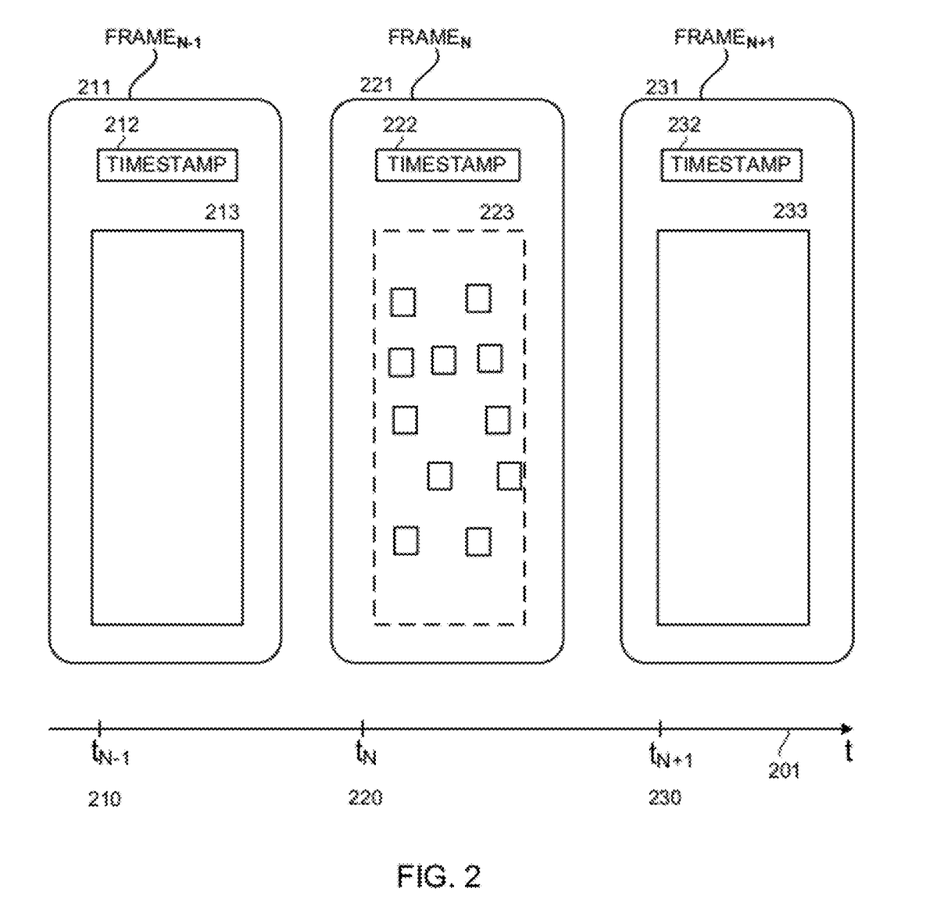
FIG. 2 is a diagram of media stream data.

FIG. 2 illustrates properties of media stream data in a computer system context. A reference timeline t 201 shows time value increasing to the right, as can be expressed in a clock counter in a computer system. Specific values of time associated with specific sequential frames of media stream data are indicated along the reference timeline. A frame of media stream data Frame$_N$ 221 can be associated with time t$_N$ 220 on the timeline. Similarly, Frame$_{N-1}$ 211 can be associated with time t$_{N-1}$ 210 that is earlier than t$_N$ 220, and Frame$_{N+1}$ 231 can be associated with time t$_{N+1}$ 230 that is later than t$_N$ 220.

A timestamp is shown disposed with each frame in the diagram. Timestamps 212, 222, and 232 are associated with Frame$_{N-1}$ 211, Frame$_N$ 221, and Frame$_{N+1}$ 231, respectively. It may be appreciated that there can be many alternative means of associating one or more timestamps with their respective frames; in the diagram the timestamps are simply shown as contained within the boundaries of their respective frames by way of example and not limitation.

Similarly, each group of media stream data is shown as simply contained within its associated frame, although it may be appreciated that there can be many alternative means of associating a group of media stream data with its respective frame. A group of media stream data 223 can be associated with FrameN 221. Similarly, media stream data 213 can be associated with Frame$_{N-1}$ 211, and media stream data 233 can be associated with Frame$_{N+1}$ 231.

A frame of media stream data can correspond to the two-dimensional display of a video image frame, but the concept of framing media stream data is much more general. A frame of media stream data can comprise any convenient grouping of data in a media stream. The framing of media stream data can be organized towards the goal that the data can be processed as a steady and continuous stream. The media stream data can represent any of many types of media. By way of example and not limitation, media streams can be made up of many standard and non-standard forms of audio, video, MIDI, and high-definition video, as well as combinations of those and other forms. In addition, media streams can be made up of other forms of information streams such as those typically found in electronic communications and telemetry.

The disclosed system and method can apply to media stream inputs such as digital video such as described in International Telecommunications Union standards ITU-R BT.601 and/or ITU-R BT.656. Such media streams inputs can have properties such as providing a continuous stream of information, and having per-frame or other events occurring with a variety of timing properties. The timing properties can have a specific precision and can comprise any of repetition and/or being isochronous and/or being synchronized with other signals and/or being synchronized with other signals. These timing properties of a media stream are not necessary for the practice of the disclosed system and method. The disclosed system and method can apply to many forms of media stream inputs.

In some embodiments the media stream input frames such as those illustrated as Frame$_N$ 221, Frame$_{N-1}$ 211, and Frame$_{N+1}$ 231 can correspond to the two-dimensional display of a video image frame. The media stream input frames' transmission and storage and other formats can be organized advantageously for a digital video input; the digital video input can be as described in ITU-R BT.601 and/or ITU-R BT.656. In some embodiments the specific time t$_N$ 220 shown on the reference timeline 201 can correspond precisely to the moment when a particular feature of the video image structure that occurs uniquely once per frame, in the media stream input data associated with Frame$_N$ 221, is captured by a media stream capture subsystem of a computer system. By way of example and not limitation, one such particular feature can be the onset of the first vertical blanking interval (VBI) within a video frame. The timestamp 222 can take on the value of t$_N$ 220, expressed in terms of one or more timebases. The association of the measured timestamp value for Frame$_N$ can be helpful in playback synchronization and other processes. An example use of the disclosed system and method is to provide playback synchronization that can maintain the same timing relationship on output playback as input capture. Such a timing relationship is illustrated between the three sequential frames of FIG. 2. That is, one example use of the disclosed system and method can be to enable a computer system to play back captured media stream input data in a manner that maintains the same timing relationships between elements of the media stream on output during playback as are present on input during capture. There can be many other playback synchronization tasks and features that benefit from the disclosed system and method.

Figure 3:
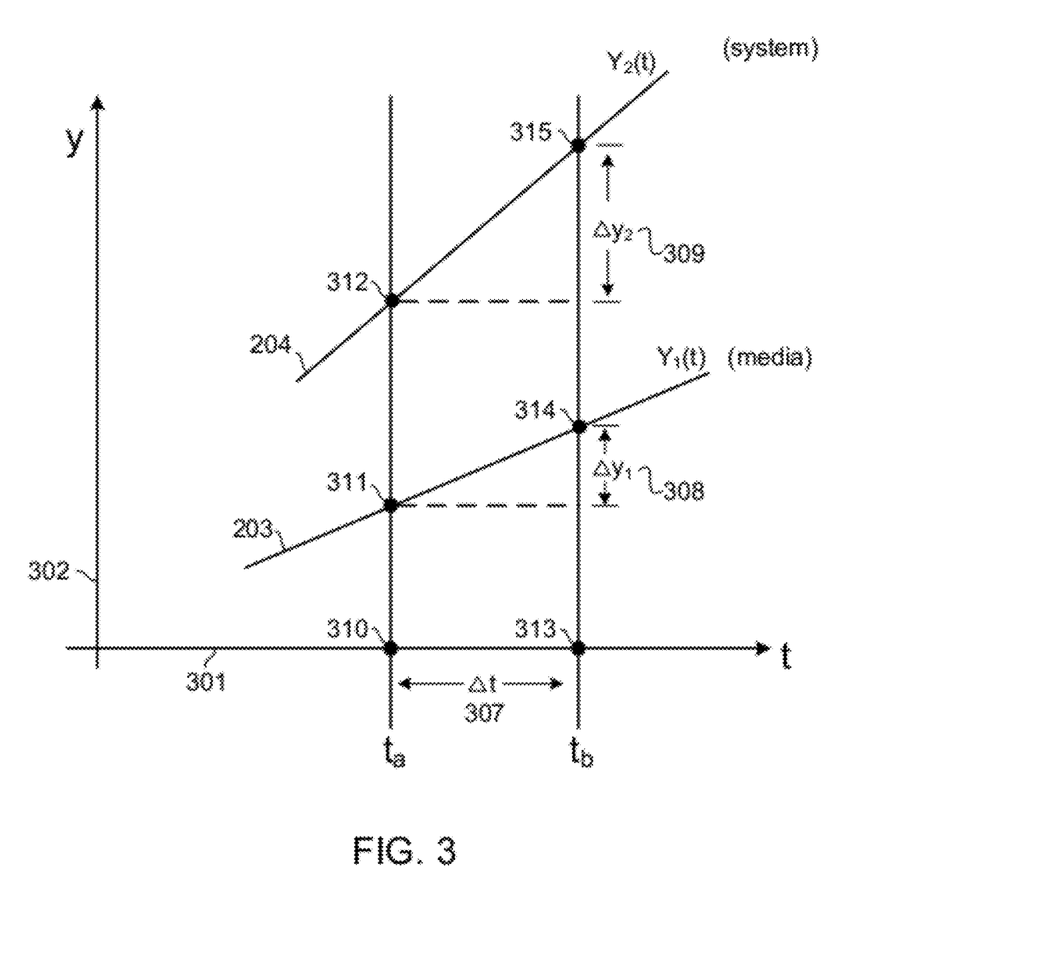
FIG. 3 illustrates a functional relationship between multiple timebases.

FIG. 3 shows relationships between concurrent timebases. The axis of the abscissa provides a measurement scale along a reference timebase denoted t 301. The axis of the ordinate provides a measurement scale that can represent clock counting units denoted y 302. Timebases of interest are represented as the functions Y$_1$(t) 203 and Y$_2$(t) 204. In this diagram the functions Y$_1$ and Y$_2$ are modeled as linear functions of the reference time parameter t 301. That is, Y$_1$(t)=m$_1$×t+b$_1$ and Y$_2$(t)=m$_2$×t+b$_2$. The constants m$_1$ and m$_2$ are slopes, and, the constants b$_1$ and b$_2$ are offsets, in the familiar slope-intercept form of an equation of a line in two dimensions. The timebase function values are shown at two points in (reference) time, t$_a$ 310 and t$_b$ 313. The time interval between t$_a$ and t$_b$ is Δt 307.

Note that $\Delta t = t_b - t_a$.

The diagram shows Y$_1$(t$_a$) 311, Y$_2$(t$_a$) 312, Y$_1$(t$_b$) 314, and Y$_2$(t$_b$) 315. The differences in each function value along the ordinate axis over the Δt interval are shown as Δy$_1$ 308 and Δy$_2$ 309.

Note that $\Delta y_1 = Y_1(t_b) - Y_1(t_a)$ and $\Delta y_2 = Y_2(t_b) - Y_2(t_a)$.

These linear relationships apply:

$$Y_2(t_b)=Y_2(t_a)+m_2 \times \Delta t + b_2 \text{ and } Y_1(t_b)=Y_1(t_a)+m_1 \times \Delta t + b_1$$

where $$m_1 = \Delta y_1/\Delta t \text{ and } m_2 = \Delta y_2/\Delta t$$

Figure 4:
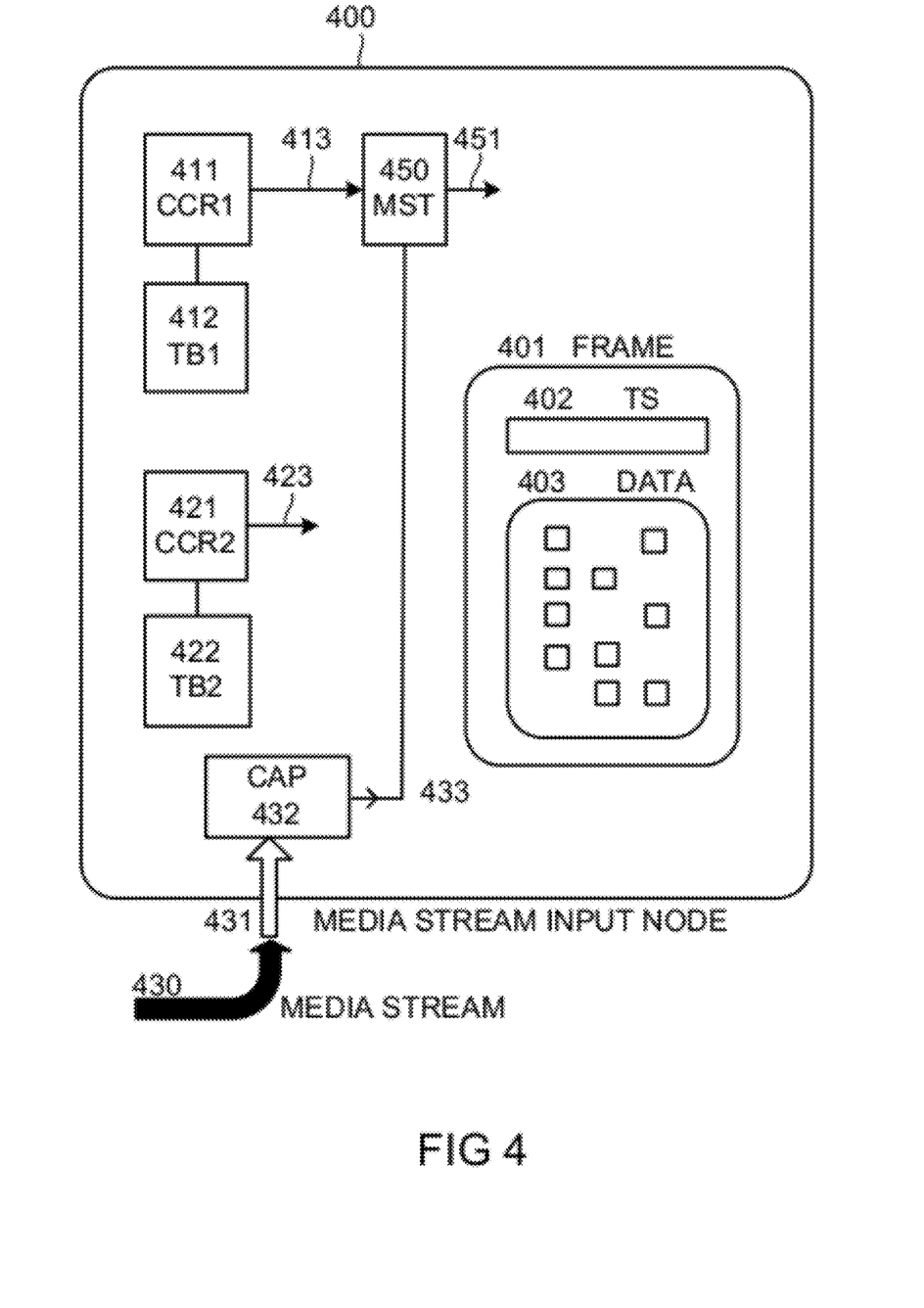
FIG. 4 is a block diagram of elements of a computer system for providing timestamps for media stream input data.

A computer system 400 embodiment comprising elements shown in FIG. 4 can provide timestamps for media stream input data. A media stream 430 can be present on media stream input node 431. The block CAP 432 comprises elements of a media stream capture subsystem. Media stream input node 431 is coupled with CAP 432. Media sample time register MST 450 is coupled with CAP output 433. MST 450 can be loaded responsively to a signal on CAP output 433. Input to MST 450 is coupled with the output 413 of a first clock count register CCR1 411. Output 451 of the media sample register MST 450 can provide a media sample time value.

Clock count register CCR1 411 can provide a clock count value on its output 413 responsive to a first timebase. Block TB1 412 can comprise means for providing the first timebase to CCR1 411 and to other system elements. The first timebase can comprise a clock signal output or other timing signal or signals outputs. These outputs of the first timebase can be responsive to one or more media stream inputs or other inputs to the computer system, such as a standard video timing synchronization signal input such as "black burst", and/or responsive to one or more elements within the computer system, such as an internal clock oscillator. In some embodiments, the first timebase TB1 412 is coupled with clock count register CCR1.

Clock count register CCR2 421 can provide a clock count value on its output 423 responsive to a second timebase. Block TB2 422 can be comprising means for providing the second timebase to CCR2 421 and to other system elements. The second timebase can provide a clock signal output or other timing signal or signals outputs. These outputs of the second timebase can be responsive to one or more media stream inputs or other inputs to the computer system, such as a standard video timing synchronization signal input such as "black burst", and/or responsive to one or more elements within the computer system, such as an internal clock oscillator. In some embodiments, the second timebase TB2 422 is coupled with clock count register CCR2.

Each of the first timebase and second timebase can each be responsive, concurrently, to one or more of the timing references just described. In some embodiments blocks TB1 412 and TB2 422 can concurrently provide substantially similar timebases to CCR1 411, CCR2 421, and other system elements.

The data structure FRAME 401 corresponds to an instance of a frame of captured media stream input data. The structure FRAME 401 can include an associated timestamp TS 402 and/or a group of media stream data DATA 403. There can be many alternative means of associating one or more timestamps with their frame of captured media stream input data; in the diagram timestamp TS 402 is simply shown as contained within the boundaries of the frame by way of example and not limitation. Similarly, a group of media stream data DATA 403 is shown as simply contained within the frame, although there can be many alternative means of associating a group of media stream data with its respective frame.

Elements that constitute embodiments of computer system 400 can be accessible to and by the system processor or processors and generally amenable to programmatic control, having properties comprising read access and write access.

In some embodiments computer system 400 can perform a procedure to correlate a first timebase to a second timebase. The procedure can be as follows:

Referring to FIG. 3 and the preceding discussion of linear relationships:

The values of $t_a$, $Y_1(t_a)$, and $Y_2(t_a)$ can first be determined. The processor can query the operating system for a system or reference time, and simply read the value of registers CCR1 413 and CCR2 423, thus providing values for $t_a$, $Y_1(t_a)$, and $Y_2(t_a)$, respectively. Techniques can be used to minimize the measurement error, that is, the degree to which the reads and system queries are not precisely simultaneous. These techniques can comprise repeated sampling of the values with minimal interruption between sampling events and interpolation of the resulting sample data.

The values of $tb$, $Y_1(t_b)$ and $Y_2(t_b)$ can be similarly determined at a time $t_b$ following $t_a$. Then $\Delta t$ can be assigned the value of $(t_b - t_a)$.

It then follows from $Y_1(t_b) = Y_1(t_a) + (m_1 \times t)$ that $$m_1 = (Y_1(t_b) - Y_1(t_a))/\Delta t, \text{ so } m_1 \text{ can be computed.}$$

It follows from $Y_1(t_b) = (m_1 \times t_b) + b_1$ that $$b_1 = Y_1(t_b) - (m_1 \times t_b), \text{ so } b_1 \text{ can be computed.}$$

Similarly, $m_2$ and $b_2$ can be determined.

It follows from $Y_2(t_b) = Y_2(t_a) + (m_2 \times \Delta t)$ that $$m_2 = (Y_2(t_b) - Y_2(t_a))/\Delta t, \text{ so } m_2 \text{ can be computed.}$$

It follows from $Y_2(t_b) = (m2 \times t_b) + b_2$ that $$b_2 = Y_2(t_b) - (m2 \times t_b), \text{ so } b_2 \text{ can be computed.}$$

Given the relationship between the two timebase functions $Y_1$ and $Y_2$ as shown above, an embodiment can express a timestamp measured on one timebase in terms of the other. That is, for a given reference time $t_F$ and timestamp value $Y_1(t_F)$, an embodiment can compute $Y_2(t_F)$, as follows.

Each timebase function can be expressed in slope-intercept form as:

$$Y_1(t_F) = (m_1 \times t_F) + b_1 \text{ and } Y_2(t_F) = (m_2 \times t_F) + b_2.$$

Solving in terms of known quantities yields:

$$Y_2(t_F) = ((m2/m1) \times (Y_1(t_F) - b_1)) + b_2.$$

In some embodiments, the reference timeline t 301 can be substantially similar to the second timebase function $Y_2$ 204. In this case, approximations can be made that $m_2 = 1$ and $b_2 = 0$, resulting in the simplification $$Y_2(t_F) = t_F = (Y_1(t_F) - b_1)/m_1.$$

In some embodiments there can be an appreciable time delay between the time that a specific frame of media sample input data, or specific feature of the frame of media sample data, is present at the media stream input node 431 and the time of the associated programmatic response by the processor. In some embodiments a frame of media stream input data can be first captured within a media stream capture subsystem 140 and transferred to main memory by DMA or other means. An interrupt service request can be generated at the conclusion of the transfer in order to inform the processor of the event. There can be further delay in processor response following the interrupt service request. In some embodiments an interrupt service request can result in a call to an interrupt service routine that can schedule a deferred procedure call. The deferred procedure call can schedule a passive thread.

Code attending to the concluded transfer to main memory of a frame of media stream input data can be within the passive thread.

In some embodiments CAP 432 can detect a specific feature of a frame of media sample data as it is first input to the media stream capture subsystem 140 and responsively provide a signal on output 433 that can enable media sample time counter MST 450 to load its input 413. The value of the clock count register CCR1 411 output 413 loaded into MST 450 can be described as a timestamp for the captured frame of media stream data, expressed in terms of the first timebase, where the first timebase is disposed with CCR1 411. This timestamp can be transferred to main memory by DMA or other means. The timestamp can remain associated with the captured frame of media stream input data.

Some embodiments are disposed with a Microsoft DirectShow software environment (MSDSE).

To accomplish a software task in the MSDSE, a software application can create one or more filters and connect them together. A set of filters that work together is called a filter graph. Filters are basic building blocks of the MSDSE. Processing of media stream input data can be divided into discrete steps in the MSDSE, and each filter represents one or more steps.

A Media Sample in the MSDSE can comprise a captured frame of media stream input data. A Media Sample can have an associated timestamp value. When a MSDSE filter operates on a Media Sample, it can assume that the timestamp value is expressed in terms of a timebase associated with a clock object. An arbitrary clock object can have been assigned to the filter graph that includes the filter, and that clock object can apply to all filters in the filter graph.

A capture filter in the MSDSE can comprise a capture driver. In one embodiment as described herein, the capture driver can be responsible for associating a timestamp value from the output 451 of MST 450 with a captured frame of media stream input data.

The capture filter can compute a timestamp value expressed in terms of a second timebase from a timestamp expressed in terms of the first timebase. In one embodiment, the first timebase 412 can be an element of a media stream capture subsystem 140. The second timebase can be the timebase associated with the specific clock object that has been assigned to the operative filter graph. The first timebase and second timebase can be different from each other and have substantially different characteristics than each other.

That is, a timestamp value referenced to a second timebase can be computed from a timestamp value referenced to a first timebase. This computation can benefit from having specifics of that correlation available. The timestamp value referenced to the second timebase can be associated with a captured frame of media stream input data with which the timestamp value referenced to the first timebase has already been associated.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed is:

1. In a computer system having a media stream input, a system for providing timestamps within media stream input data comprising:
   a media sample time register;
   a first clock circuit comprising a first clock count register;
   wherein the first clock circuit is at least responsive to and disposed with a first timebase;
   a second clock circuit comprising a second clock count register;
   wherein the second clock circuit is at least responsive to and disposed with a second timebase;
   means for capturing a frame of media stream input data;
   wherein the system is adapted to load the media sample time register from the first clock count register responsive to a capture of a frame of media stream input data;
   wherein the system is adapted to read a media sample time value from the media sample time register;
   wherein the system is adapted to correlate the first timebase with the second timebase by
      performing a first measurement of the first clock count register and the second clock count register at a first specified time,
      performing a second measurement of the first clock count register and the second clock count register at a second specified time, and,
      determining a parameter set that defines a relationship between the second timebase and the first timebase, at least responsive to the first measurement and the second measurement;
   wherein the system is adapted to compute a timestamp value in terms of the second timebase, responsive to the media sample time value, responsive to the capture of the frame of media stream input data, and responsive to the correlation of the first timebase with the second timebase; and
   wherein the system is adapted to associate the timestamp value that is in terms of the second timebase with the captured frame of media stream input data.

2. The system of claim 1
   wherein the system is adapted to store the timestamp value that is in terms of the second timebase with the captured frame of media stream input data.

3. The system of claim 2, further comprising:
   a PCI system clock; and,
   wherein the first timebase is responsive to the PCI system clock.

4. The system of claim 2, further comprising:
   an audio sample clock; and,
   wherein the first timebase is responsive to the audio sample clock.

5. In a computer system having a media stream input node, a method of providing timestamps for media stream input data comprising the steps of:
   providing a media sample time register;
   providing a first clock circuit comprising a first clock count register at least responsive to and disposed with a first timebase;
   providing a second clock circuit comprising a second clock count register at least responsive to and disposed with a second timebase;
   capturing a frame of media stream input data;
   loading the media sample time register from the first clock count register responsive to the capture of the frame of media stream input data;
   reading a media sample time value from the media sample time register;

correlating the first timebase with the second timebase;
wherein correlating the first timebase with the second timebase comprises the steps of:
  performing a first measurement of the first clock count register and the second clock count register at a first specified time;
  performing a second measurement of the first clock count register and the second clock count register at a second specified time; and,
  determining a parameter set that defines a relationship between the second timebase and the first timebase, at least responsive to the first measurement and the second measurement;
computing a timestamp value in terms of the second timebase, responsive to the media sample time value, responsive to the capture of the frame of media stream input data, and responsive to the correlation of the first timebase with the second timebase; and
associating the timestamp value that is in terms of the second timebase with the captured frame of media stream input data.

6. The method of claim 5, further comprising the steps of:
providing a PCI system clock; and
disposing the first timebase as responsive to the PCI system clock.

7. The method of claim 5, further comprising the steps of:
providing an audio sample clock; and
  disposing the first timebase as responsive to the audio sample clock.

* * * * *